United States Patent [19]

Cameron

[11] Patent Number: 4,530,021
[45] Date of Patent: Jul. 16, 1985

[54] MICROMOTION RELEASE OF HEADS FROM LUBRICATED MAGNETIC DISKS

[75] Inventor: Tucson Cameron, San Jose, Calif.

[73] Assignee: International Business Machines Corporation, Armonk, N.Y.

[21] Appl. No.: 444,561

[22] Filed: Nov. 26, 1982

[51] Int. Cl.³ ............ G11B 5/012; G11B 5/55
[52] U.S. Cl. ............................ 360/97; 360/103; 360/106
[58] Field of Search ............ 360/97–99, 360/102, 103, 105, 106

[56] References Cited

U.S. PATENT DOCUMENTS 3,453,611 7/1969 Laermer .................. 360/103
3,855,622 12/1974 Truscelli ................. 360/103

FOREIGN PATENT DOCUMENTS 53-42020 4/1978 Japan .................. 360/103
58-68270 4/1983 Japan .................. 360/99
708411 5/1980 U.S.S.R. ............... 360/103

Primary Examiner—A. J. Heinz
Attorney, Agent, or Firm—Walter J. Madden, Jr.; Thomas R. Berthold

[57] ABSTRACT

In a magnetic recording disk file in which one or more magnetic sliders rest on the surfaces of the disks when the disks are not rotating, a short oscillatory micromotion is imparted to the slider or sliders prior to starting rotation of the disks, this micromotion serving to free the slider or sliders from any stiction forces tending to bind them to the disk surface.

2 Claims, 2 Drawing Figures $t_0$ = POWER ON
$t_1$ = START VCM DRIVE FOR MICROMOTION
$t_3$ = START DISK
$t_4$ = STOP MICROMOTION

MICROMOTION RELEASE OF HEADS FROM LUBRICATED MAGNETIC DISKS

BACKGROUND OF THE INVENTION

1. Field of the Invention

This invention relates to magnetic recording disk files and relates more particularly to methods for overcoming forces tending to bind the magnetic sliders and heads to the disk surfaces when the disk or disks have been at rest.

2. Description of Prior Art

In current magnetic recording disk files there have been problems encountered with the sliders containing magnetic heads tending to adhere to the surface of the disk or disks after the disk has been at rest. This adhering or stiction problem is aggravated by the presence on the disk surface of lubricant material which studies have shown tends to puddle up between the disk surface and the slider when the disk is not in motion and the slider rests on the disk surface. This stiction problem is a relatively new one in magnetic disk files. In early magnetic disk files, as exemplified by the IBM 2311, 2314 and 3330 disk drives, the magnetic sliders were never in contact with the magnetic record surface (except in the event of an inadvertent head "crash"). Instead, the sliders were removed from the disk area prior to powering down the disk drive and, upon powering up, were not repositioned over the disk area until the disks were rotating at a speed sufficient to generate an air-bearing for supporting the sliders in a "flying" mode above the rotating disk surface. Hence, disk files of this type had no "stiction" problems between the slider and disk.

With the advent of the IBM 3340 disk drive in 1973, the "start-stop in-contact" mode of the disk file operation was introduced with a lubricant applied to the disk surface. This disk file and subsequent files permitted the sliders to contact the recording disk surface (usually in a non-data portion thereof) when the file was powered down, and were in contact with the surfaces when the file was powered up. It is in this latter situation that possible problems with stiction arise.

In the disk files involved herein, the sliders are movable radially of the disk to be positioned over a selected one of a group of concentric recording tracks. The sliders are carried on a suspension assembly connected ultimately to an actuator. The slider and its suspension have relatively good rigidity radially of the disk, but they are somewhat fragile when subjected to tangential force. Such tangential force is just what is applied to the suspension when stiction is encountered. As the disk begins rotation, the lubricant under the slider face tends to hold the slider, and as the disk picks up rotational speed, substantial forces can be applied tangentially of the slider and suspension, resulting in damage to or destruction of the suspension, and possible damage to the disk surface.

SUMMARY OF THE INVENTION

In accordance with the present invention, the slider and its suspension structure are moved a slight amount in each direction a number of times prior to applying power to rotate the disks at file startup. This controlled micromotion has been found to be very effective in freeing the slider from the stiction forces which tend to bind it to the lubricant layer on the disk surface.

DESCRIPTION OF THE PREFERRED EMBODIMENT

The present invention may be employed in a disk file of a suitable type such as that shown in U.S. Pat. No. 4,136,293, which patent is incorporated by reference herein. Such a disk file includes a head/disk assembly (HDA) which contains a plurality of magnetic recording disks mounted on a shaft for common rotation by a drive motor which is external to the HDA. The HDA also includes a plurality of sliders carrying magnetic heads for magnetically cooperating with different concentric recording tracks on the disk surfaces. In the above patent, the heads in the HDA are moved to different tracks by two actuators having coils which are movable in separate gaps of a common voice coil motor (VCM) structure. It is this VCM structure and the coils therein which are used in the present invention to provide oscillatory micromotion of the heads prior to the application of power to drive the disks.

Figure 1:
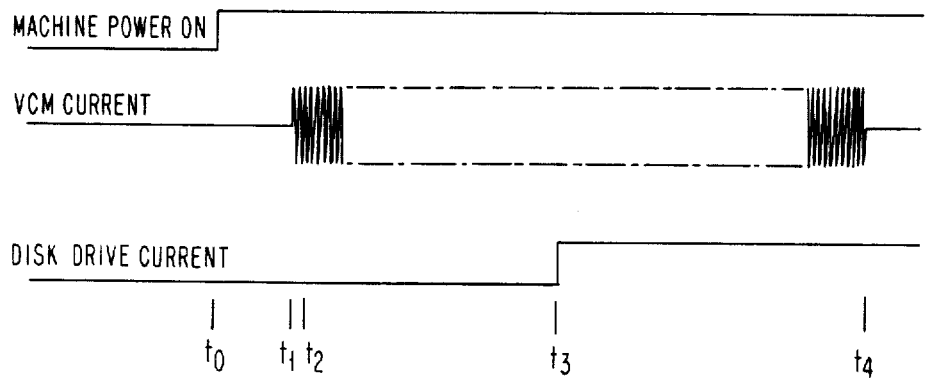
FIG. 1 is a timing diagram showing the relationship between the micromotion employed in this invention and the application of drive power to the disks.

Referring to FIG. 1, time $t_o$ represents the time at which power is supplied to the drive but not to the disk drive motor. A short time thereafter, at time $t_1$, the micromotion of the present invention is begun by supplying an oscillating current to the coils of the VCM. This produces a small amount of motion of the heads radially of the disks and serves to initiate breaking them free of the stiction forces which may tend to bind them to the lubricant on the disk surfaces. At some time $t_3$ and $t_1$, power may be applied to the disk drive motor to initiate rotation of the disks, and at time $t_4$ the micromotion current supplied to the VCM coils may be turned off to terminate the micromotion.

Figure 2:
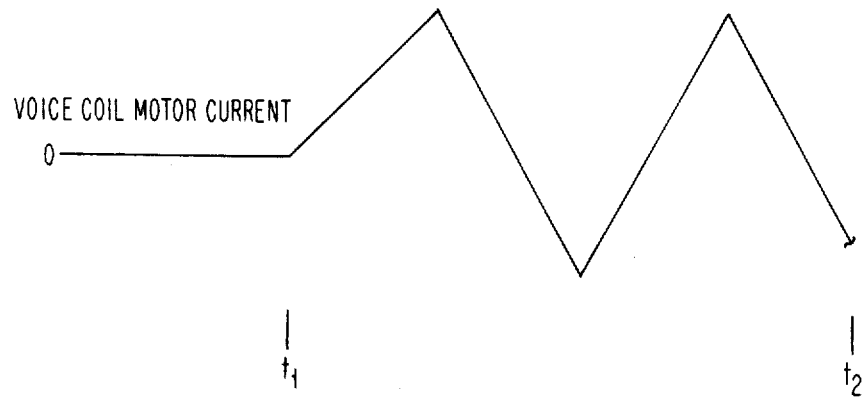
FIG. 2 is a graph showing the shape of the current waveform supplied to the actuator to produce the micromotion.

FIG. 2 is a graph of the shape of the current waveform employed in a disk file of the type shown in the above-identified U.S. patent to produce oscillatory motion of the sliders in the disk film. The current waveform is shown for the interval between $t_1$ and $t_2$ in FIG. 1 and is representative of the current waveform for the entire interval $t_1$–$t_4$. It has been found that when such micromotion is employed every time the disk file is powered on, it is very effective in reducing or eliminating stiction problems with their attendant risk of damage to the sliders or disks, or both.

I claim:

1. A method for reducing the stiction force existing between an air-bearing slider and a rotatable magnetic recording disk on whose surface said slider rests when said disk is not rotating, said slider being connected to an electric actuator motor for movement to different data tracks on said disk surface, the method comprising the steps of energizing said actuator motor to oscillate said slider relative to the stationary disk surface, initiating rotation of the disk, and then terminating the oscillation of said slider.

2. A method in accordance with claim 1 in which said actuator motor is an electric voice coil motor and wherein the step of energizing further comprises supplying said voice coil motor with current which alternates between positive and negative values.

* * * * *

UNITED STATES PATENT AND TRADEMARK OFFICE
CERTIFICATE OF CORRECTION

PATENT NO. : 4,530,021

DATED : July 16, 1985

INVENTOR(S) : Tucson Cameron

It is certified that error appears in the above—identified patent and that said Letters Patent is hereby corrected as shown below:

Column 2, line 36, "and" should be --after--.

Signed and Sealed this

Nineteenth Day of November 1985

[SEAL]

Attest:

Attesting Officer

DONALD J. QUIGG

Commissioner of Patents and Trademarks